(12) United States Patent
Luo et al.

(10) Patent No.: US 10,668,615 B2
(45) Date of Patent: Jun. 2, 2020

(54) SERVICE ROBOT AND METHOD FOR CONTROLLING SAME

(71) Applicant: GOERTEK INC., Shandong (CN)

(72) Inventors: Zhiping Luo, Weifang (CN); Zhenyu Yu, Weifang (CN); Xiangdong Zhang, Weifang (CN); Jianming Du, Weifang (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 16/082,738

(22) PCT Filed: Apr. 28, 2017

(86) PCT No.: PCT/CN2017/082323
§ 371 (c)(1),
(2) Date: Sep. 6, 2018

(87) PCT Pub. No.: WO2017/186154
PCT Pub. Date: Nov. 2, 2017

(65) Prior Publication Data
US 2019/0022850 A1    Jan. 24, 2019

(30) Foreign Application Priority Data

Apr. 28, 2016    (CN) .......................... 2016 1 0280377

(51) Int. Cl.
*B05B 3/00* (2006.01)
*B25J 5/00* (2006.01)
(Continued)

(52) U.S. Cl.
CPC ............. *B25J 5/007* (2013.01); *B25J 9/0003* (2013.01); *B25J 11/008* (2013.01)

(58) Field of Classification Search
CPC . B25J 11/00; B25J 11/008; B25J 5/007; B25J 9/0003; B25J 9/16
See application file for complete search history.

(56) References Cited

U.S. PATENT DOCUMENTS

2015/0217443 A1* 8/2015 Tadayon ................. B25J 5/02
700/253
2016/0121486 A1* 5/2016 Lipinski ............... B05B 13/005
427/427.3

FOREIGN PATENT DOCUMENTS

CN          2125513 U     12/1992
CN        201002479 Y      1/2008
(Continued)

OTHER PUBLICATIONS

ISA/CN, International Search Report (with English translation), dated Nov. 2, 2017, re PCT International Patent Application No. PCT/CN2017/082323.
(Continued)

*Primary Examiner* — Muhammad S Islam
(74) *Attorney, Agent, or Firm* — Perry + Currier Inc.

(57) ABSTRACT

A service robot and a method for controlling the same are disclosed. The service robot comprises a main body (101) and a base (102). A motor (1021), a transmission mechanism (1022) and a wheel (1023) are provided in an inner cavity of the base (102). The transmission mechanism (1022) is connected with the motor (1021) and the wheel (1023) respectively. The wheel (1023) is disposed below the transmission mechanism (1022). A space for the transmission mechanism (1022) to move up and down is formed in the inner cavity of the base (102). After the motor (1021) is started, the transmission mechanism (1022) is driven to move in the inner cavity of the base (102, 26) according to a predetermined stroke, and the transmission mechanism (1022) drives the wheel (1023) while the transmission mechanism (1022) is moving so that the wheel (1023) can retract into the inner cavity of the base (102) or extend out of the inner cavity of the base (102).

12 Claims, 4 Drawing Sheets

S41
Providing a motor, a transmission mechanism and a wheel in an inner cavity of a base of the service robot, connecting the transmission mechanism with the motor and the wheel respectively, disposing the wheel below the transmission mechanism, and reserving a space in the inner cavity of the base for the transmission mechanism to move up and down S42
Driving the transmission mechanism to move in the inner cavity of the base according to a predetermined stroke by the motor after the motor is started, and driving the wheel while the transmission mechanism is moving so that the wheel can retract into the inner cavity of the base or extend out of the inner cavity of the base

(51) Int. Cl.
 *B25J 9/00* (2006.01)
 *B25J 11/00* (2006.01)

(56) References Cited

FOREIGN PATENT DOCUMENTS

| | | |
|---|---|---|
| CN | 202080062 U | 12/2011 |
| CN | 203818924 U | 9/2014 |
| CN | 104149546 A | 11/2014 |
| CN | 104440854 A | 3/2015 |
| CN | 204567134 U | 8/2015 |
| CN | 105415344 A | 3/2016 |
| CN | 105818149 A | 8/2016 |
| CN | 205766169 U | 12/2016 |
| PL | 389985 A1 | 7/2011 |

OTHER PUBLICATIONS

SIPO, First Office Action (with English translation), dated Jul. 19, 2017, re Chinese Patent Application No. 201610280377.6.
SIPO, Supplementary Search, dated Mar. 27, 2018, re Chinese Patent Application No. 201610280377.6.
SIPO, Second Office Action (English translation Not Available), dated Apr. 4, 2018, re Chinese Patent Application No. 201610280377.6.

\* cited by examiner

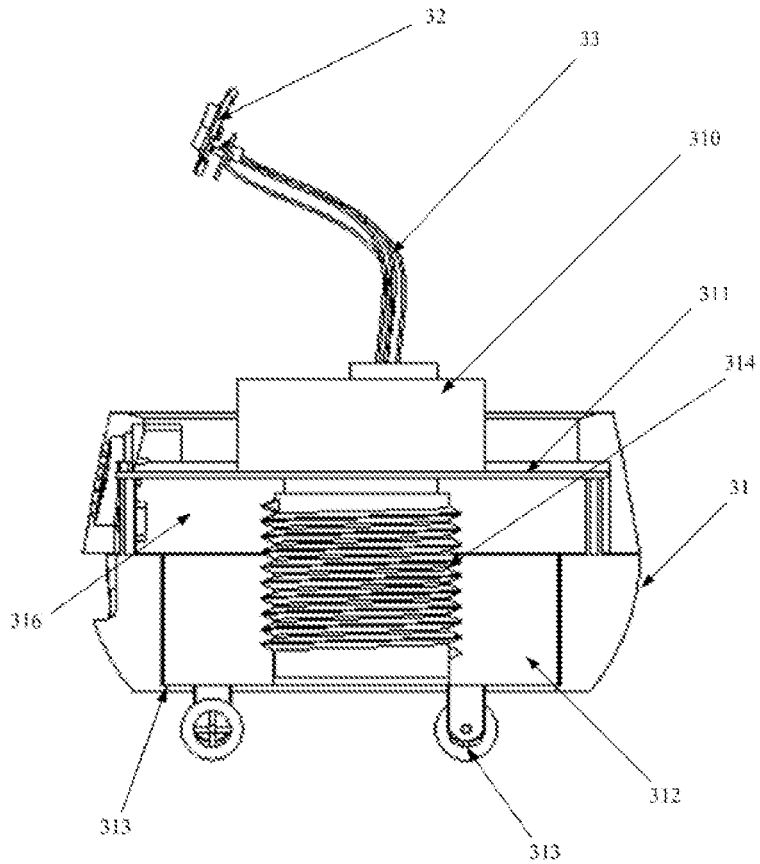

FIG. 3b

| |
|---|
| Providing a motor, a transmission mechanism and a wheel in an inner cavity of a base of the service robot, connecting the transmission mechanism with the motor and the wheel respectively, disposing the wheel below the transmission mechanism, and reserving a space in the inner cavity of the base for the transmission mechanism to move up and down |

S41

| |
|---|
| Driving the transmission mechanism to move in the inner cavity of the base according to a predetermined stroke by the motor after the motor is started, and driving the wheel while the transmission mechanism is moving so that the wheel can retract into the inner cavity of the base or extend out of the inner cavity of the base |

SERVICE ROBOT AND METHOD FOR CONTROLLING SAME

CROSS REFERENCE TO RELATED APPLICATIONS

This application is a U.S. National Stage entry under 35 U.S.C. § 371 based on International Application No. PCT/CN2017/082323, filed on Apr. 28, 2017, which was published under PCT Article 21(2) and which claims priority to Chinese Patent Application No. 201610280377.6, filed on Apr. 28, 2016. The disclosure of the priority applications are hereby incorporated herein in their entirety by reference.

TECHNICAL FIELD

The present disclosure relates to the technical field of robots, and particularly relates to a service robot and a method for controlling the same.

BACKGROUND

With the development of society and economy, indoor robots have become the first choice of home care for more and more old people and children. However, the current robots are complicated in structure and tedious in operation, its working position is fixed and cannot be adjusted, so the flexibility is poor. Therefore, the user experience of the service robot needs to be optimized.

SUMMARY

In view of the above problems, the present disclosure provides a service robot and a method for controlling the same to solve the problems of the existing service robot that its working position is fixed and cannot be adjusted, and thus the flexibility is poor.

According to an aspect of the present disclosure, there is provided a service robot comprising a main body and a base;

a motor, a transmission mechanism and a wheel are provided in an inner cavity of the base, the transmission mechanism is connected with the motor and the wheel respectively, the wheel is disposed below the transmission mechanism, and a space for the transmission mechanism to move up and down is formed in the inner cavity of the base; and after the motor is started, the transmission mechanism is driven to move in the inner cavity of the base according to a predetermined stroke, and the transmission mechanism drives the wheel while the transmission mechanism is moving so that the wheel can retract into the inner cavity of the base or extend out of the inner cavity of the base.

In some embodiments, the transmission mechanism comprises a screw and a nut engaged with the screw;

the screw is fixedly connected with the motor, and the wheel is mounted on a lower end surface of the nut;

the inner cavity of the base is cylindrical;

a guide groove is formed on a side surface of the nut, and after a column is inserted into the guide groove, the nut can only move up and down axially along the screw; and after the motor is started, the motor drives the screw to rotate, and the screw drives the nut to move up and down while the screw is rotating, and in turn drives the wheel on the nut to retract into the inner cavity of the base or extend out of the inner cavity of the base.

In some embodiments, a control button is provided on the main body of the service robot, the control button is connected with the motor through a wire, and the control button receives a start instruction inputted by a user and sends the start instruction to the motor.

In some embodiments, a first travel switch and a second travel switch are provided in the motor;

after the motor receives the start instruction sent by the control button, the motor rotates in a first preset direction, drives the screw to rotate, and in turn drives the nut and the wheel to move upward axially along the screw, and when the nut moves upward to trigger the first travel switch, the motor stops rotating; and after the motor receives the start instruction sent by the control button again, the motor rotates in a second preset direction, drives the screw to rotate, and in turn drives the nut and the wheel to move downward axially along the screw, and when the nut moves downward to trigger the second travel switch, the motor stops rotating.

In some embodiments, a first limiting member and a second limiting member are further provided in the inner cavity of the service robot;

the first limiting member is hollow disk shaped, and an upper end of the screw passes through a hollow portion of the first limiting member and is sleeved together with the first limiting member; and the second limiting member is ring shaped, and is formed by extending a lower surface of the inner cavity of the base inwardly and horizontally by a predetermined width.

In some embodiments, after the motor receives the start instruction sent by the control button, the motor rotates in a first preset direction, drives the screw to rotate, and in turn drives the nut and the wheel to move upward axially along the screw, and when the nut moves upward to the position of the first limiting member, the motor stops rotating; and after the motor receives the start instruction sent by the control button again, the motor rotates in a second preset direction, drives the screw to rotate, and in turn drives the nut and the wheel to move downward axially along the screw, and when the nut moves downward to the position of the second limiting member, the motor stops rotating.

In some embodiments, a plurality of guide grooves are evenly provided on the side surface of the nut; and the wheel is a fixed caster or a movable caster, and the number of the wheel is at least one.

According to another aspect of the present disclosure, there is provided a method for controlling a service robot, wherein the method comprises:

providing a motor, a transmission mechanism and a wheel in an inner cavity of a base of the service robot;

connecting the transmission mechanism with the motor and the wheel respectively, disposing the wheel below the transmission mechanism, and reserving a space in the inner cavity of the base for the transmission mechanism to move up and down; and driving the transmission mechanism to move in the inner cavity of the base according to a predetermined stroke by the motor after the motor is started, and driving the wheel while the transmission mechanism is moving so that the wheel can retract into the inner cavity of the base or extend out of the inner cavity of the base.

In some embodiments, the step of providing a transmission mechanism in the inner cavity of the base of the service robot comprises:

providing a screw and a nut engaged with the screw in the inner cavity of the base of the service robot;

fixedly connecting the screw and the motor, and mounting the wheel on a lower end surface of the nut;

the inner cavity of the base being cylindrical;

providing a guide groove on a side surface of the nut, so that the nut can only move up and down axially along the screw after a column is inserted into the guide groove; and driving the screw to rotate after the motor is started, driving the nut to move up and down while the screw is rotating, and in turn driving the wheel on the nut to retract into the inner cavity of the base or extend out of the inner cavity of the base.

In some embodiments, the step of driving the screw to rotate after the motor is started, driving the nut to move up and down while the screw is rotating, and in turn driving the wheel on the nut to retract into the inner cavity of the base or extend out of the inner cavity of the base comprises:

using a first travel switch and a second travel switch provided in the motor, so that after the motor is started, the motor rotates in a first preset direction, drives the screw to rotate, and in turn drives the nut and the wheel to move upward axially along the screw, and when the nut moves upward to trigger the first travel switch, the motor stops rotating; and after the motor is started again, the motor rotates in a second preset direction, drives the screw to rotate, and in turn drives the nut and the wheel to move downward axially along the screw, and when the nut moves downward to trigger the second travel switch, the motor stops rotating;

or, providing a first limiting member and a second limiting member in the inner cavity of the base, so that after the motor is started, the motor rotates in a first preset direction, drives the screw to rotate, and in turn drives the nut and the wheel to move upward axially along the screw, and when the nut moves upward to the position of the first limiting member, the motor stops rotating; and after the motor is started again, the motor rotates in a second preset direction, drives the screw to rotate, and in turn drives the nut and the wheel to move downward axially along the screw, and when the nut moves downward to the position of the second limiting member, the motor stops rotating.

The advantageous effects of the present disclosure are as follows. The service robot drives the transmission mechanism to move up and down in the inner cavity of the base by the motor, so that the wheel disposed below the transmission mechanism can retract into the inner cavity of the base or extend out of the inner cavity of the base. Because the wheel of the service robot can be automatically retracted, the service robot can be stably placed on the desk surface or other planes and work, and it can also be placed on the ground to roll and work, thereby meeting the user's needs under different circumstances and improving the competitiveness of service robots. In addition, the present disclosure also provides a method for controlling a service robot to implement the service robot.

BRIEF DESCRIPTION OF DRAWINGS

FIG. 3b is a schematic view of the structure of a service robot according to an embodiment of the present disclosure when its wheel is in an extended state; and FIG. 4 is a flowchart of a method for controlling a service robot according to an embodiment of the present disclosure.

DETAILED DESCRIPTION

The inventive concept of the present disclosure is as follows. With respect to the problems in the prior art that the wheel of the service robot cannot be automatically retracted, the working position is difficult to change, and the flexibility is poor, the present disclosure provides a service robot the wheel of which can be automatically retracted, and the service robot can, based on the user's demand, use a motor provided to drive a transmission mechanism to move, and in turn drive the wheel which is fixedly connected with the transmission mechanism to retract into the base or extend out of the base, so as to achieve the effect of being able to be stably placed on a desk surface or roll and move on the ground.

First Embodiment

Figure 1:
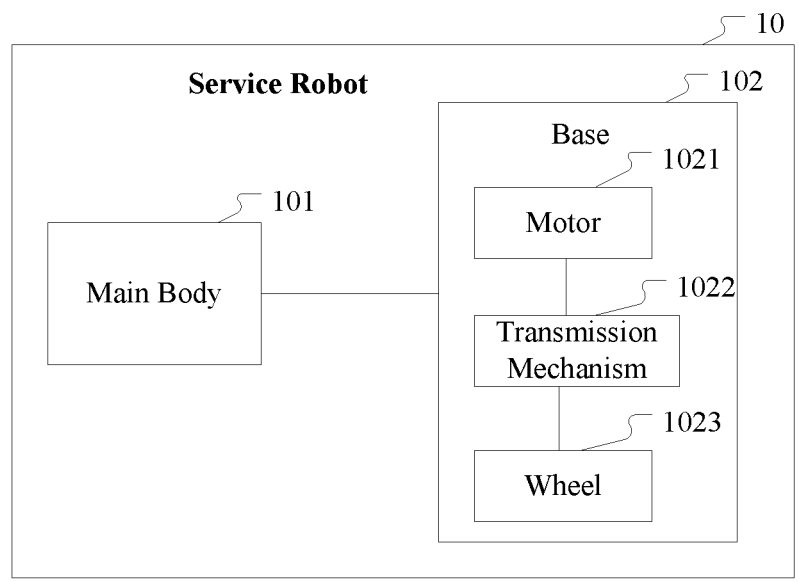
FIG. 1 is a block diagram of a service robot according to an embodiment of the present disclosure.

FIG. 1 is a block diagram of a service robot according to an embodiment of the present disclosure. Referring to FIG. 1, the service robot 10 comprises a main body 101 and a base 102.

A motor 1021, a transmission mechanism 1022 and a wheel 1023 are provided in the inner cavity of the base 102. The transmission mechanism 1022 is connected with the motor 1021 and the wheel 1023, respectively. The wheel 1023 is disposed below the transmission mechanism 1022. A space for the transmission mechanism 1022 to move up and down is formed in the inner cavity of the base 102.

After the motor 1021 is started, the transmission mechanism 1022 is driven to move in the inner cavity of the base 102 according to a predetermined stroke, and the transmission mechanism 1022 drives the wheel 1023 while the transmission mechanism 1022 is moving so that the wheel 1023 can retract into the inner cavity of the base 102 or extend out of the inner cavity of the base 102.

Thus, in the embodiment of the present disclosure, a transmission mechanism connected with the motor and the wheel respectively is provided, and a space for the transmission mechanism to move is reserved in the base, so that after the motor is started, the motor can drive the transmission mechanism to move in the inner cavity of the base according to a predetermined stroke, and in turn drive the wheel to change the displacement, whereby the wheel can retract into the inner cavity of the base to facilitate the service robot being conveniently placed on a table surface and other planes, and the wheel can also extend out of the inner cavity of the base to facilitate the service robot rolling and moving on the ground and other planes. Therefore, the diversified requirements of users are satisfied, and the competitiveness of the products is enhanced.

It should be noted that, the main function of the transmission mechanism in the present embodiment is to drive the wheel disposed below the transmission mechanism to move up and down in the inner cavity of the base under the driving of the motor, so as to realize the advantageous effects of retracting the wheel into the inner cavity of the base or extending the wheel out of the inner cavity of the base. The transmission mechanism of the embodiment of the present disclosure may be implemented in various ways, for example, by a crank slider structure or a ball screw structure. A preferred transmission mechanism used in the present disclosure will be described in detail by the Second Embodiment below.

Second Embodiment

Figure 2A:
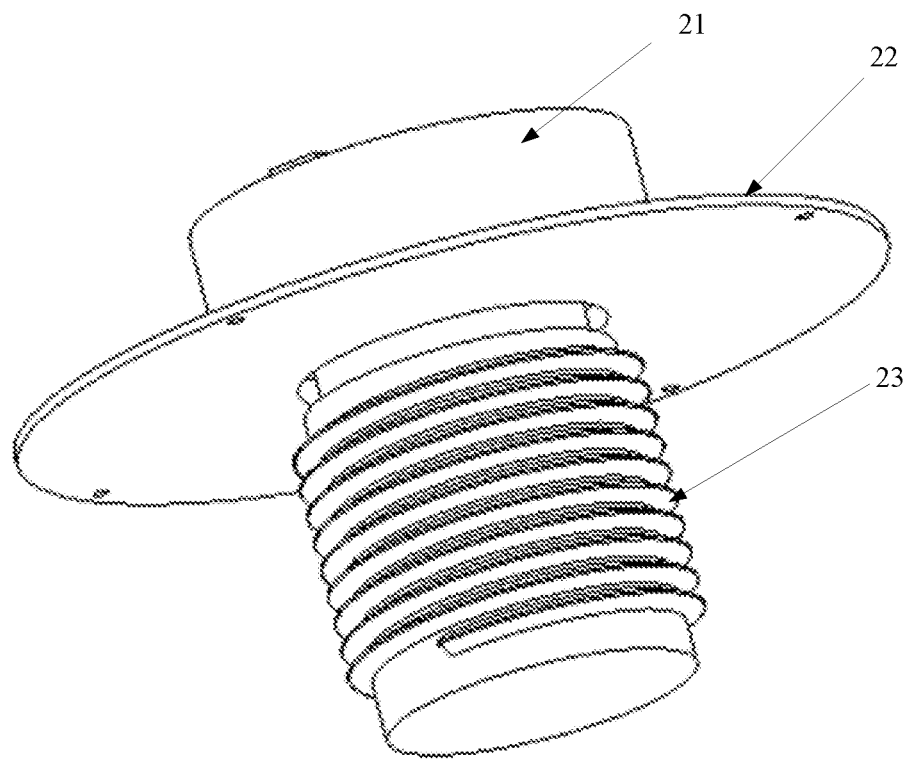
FIG. 2a is a schematic view of part of the structure of a service robot according to an embodiment of the present disclosure.
Figure 2B:
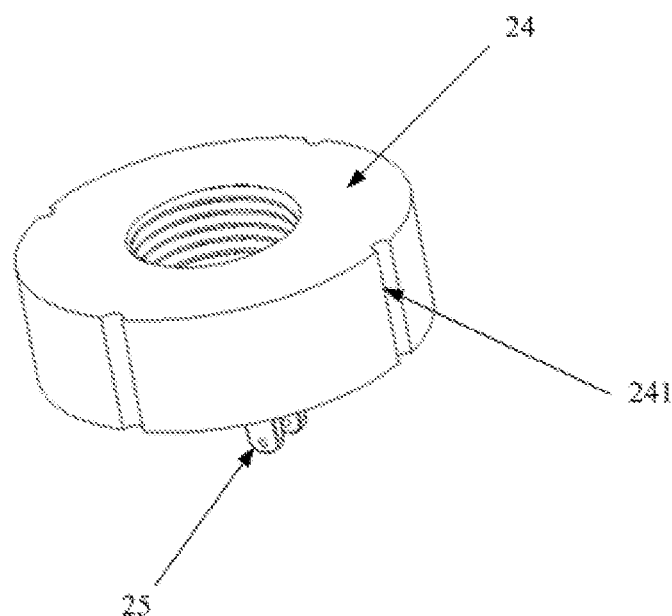
FIG. 2b is a schematic view of part of the structure of a service robot according to an embodiment of the present disclosure.
Figure 2C:
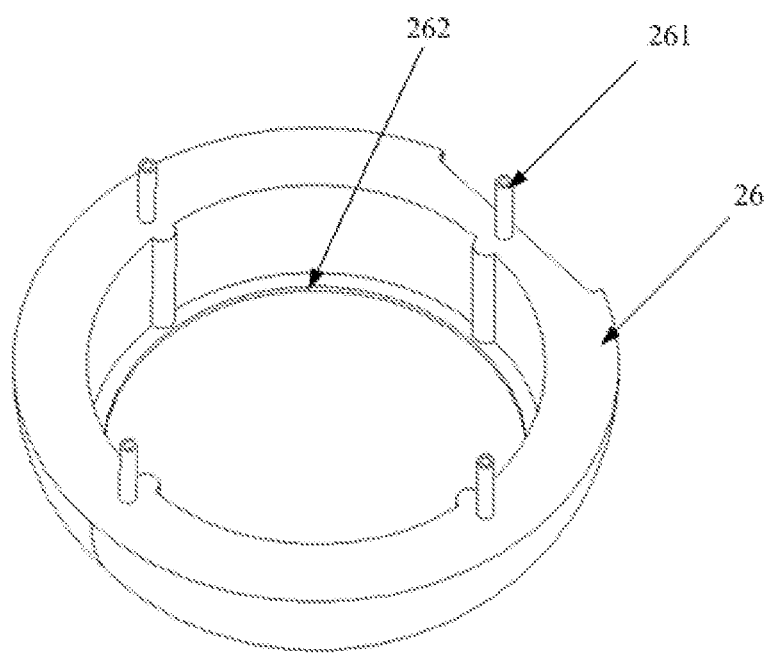
FIG. 2c is a schematic view of the structure of a base of a service robot according to an embodiment of the present disclosure.

Referring to FIG. 2a to FIG. 2c, the service robot in the present embodiment comprises a motor 21 and a transmission mechanism.

The transmission mechanism comprises a screw 23 and a nut 24 engaged with the screw 23. The screw 23 is fixedly connected with the motor 21. A wheel 25 is mounted on the lower end surface of the nut 24. The inner cavity of the base 26 is cylindrical. A guide groove 241 is formed on aside surface of the nut 24. After a column 261 is inserted into the guide groove 241, the nut 24 can only move up and down axially along the screw 23.

After the motor 21 is started, the screw 23 is controlled to rotate, and the screw 23 drives the nut 24 to move up and down while the screw 23 is rotating, and in turn drives the wheel 25 on the nut 24 to retract into the inner cavity of the base 26 or extend out of the inner cavity of the base 26.

In the present embodiment, a first limiting member 22 and a second limiting member 262 are further provided in the inner cavity of the service robot.

Referring to FIG. 2a, the first limiting member 22 is hollow disk shaped. The upper end of the screw 23 passes through a hollow portion of the first limiting member 22 and is sleeved together with the first limiting member 22.

The second limiting member 262 is ring shaped, and is formed by extending a lower surface of the inner cavity of the base 26 inwardly and horizontally by a predetermined width.

The motion control process of the service robot of the present embodiment is as follows. After the motor 21 is started according to the instruction inputted by the user, the motor 21 rotates in a first preset direction (e.g., forward direction), drives the screw 23 to rotate, and in turn drives the nut 24 and the wheel 25 to move upward axially along the screw 23. When the nut 24 moves upward to the position of the first limiting member 22, the motor 21 stops rotating. After the motor 21 receives the start instruction again, the motor rotates in a second preset direction (e.g., reverse direction), drives the screw 23 to rotate, and in turn drives the nut 24 and the wheel 25 to move downward axially along the screw 23. When the nut 24 moves downward to the position of the second limiting member 262, the motor 21 stops rotating.

Referring to FIG. 2b, in the present embodiment, four guide grooves 241 are evenly provided on aside surface of the nut 24 (i.e., the outer circumferential surface of the nut). Correspondingly, anti-rotation protrusions which are provided with four columns 261 are evenly provided on the inner surface of the inner cavity of the base 26 which is in contact with the nut 24. After these columns 261 are inserted in, the anti-rotation protrusions can be firmly engaged with the guide grooves 241 on the nut 24. It can be understood that the reason of providing the guide grooves on the nut to engage with the columns provided on the base is to prevent the nut from rotating horizontally in the inner cavity of the base rather than moving up or down axially along the screw, and thus the effect of retracting or extending the wheel cannot be achieved.

As stated above, in the present embodiment, the transmission mechanism uses a screw and a nut, and through the engagement of the screw and the nut, the wheel disposed on the lower end surface of the nut retracts into the inner cavity of the base or extends out of the inner cavity of the base. Therefore, the service robot according to the embodiment of the present disclosure can be used in two ways. Particularly, firstly, the robot can be fixedly placed on a plane (such as a desk surface or the ground) when the wheel retracts into the inner cavity of the base, and secondly, the robot can be used in rolling and moving when the wheel extends out of the inner cavity of the base.

Third Embodiment

In the present embodiment, the description is focused on the structure of the service robot when the wheel is in different states, and other contents may refer to other embodiments of the present disclosure.

Figure 3A:
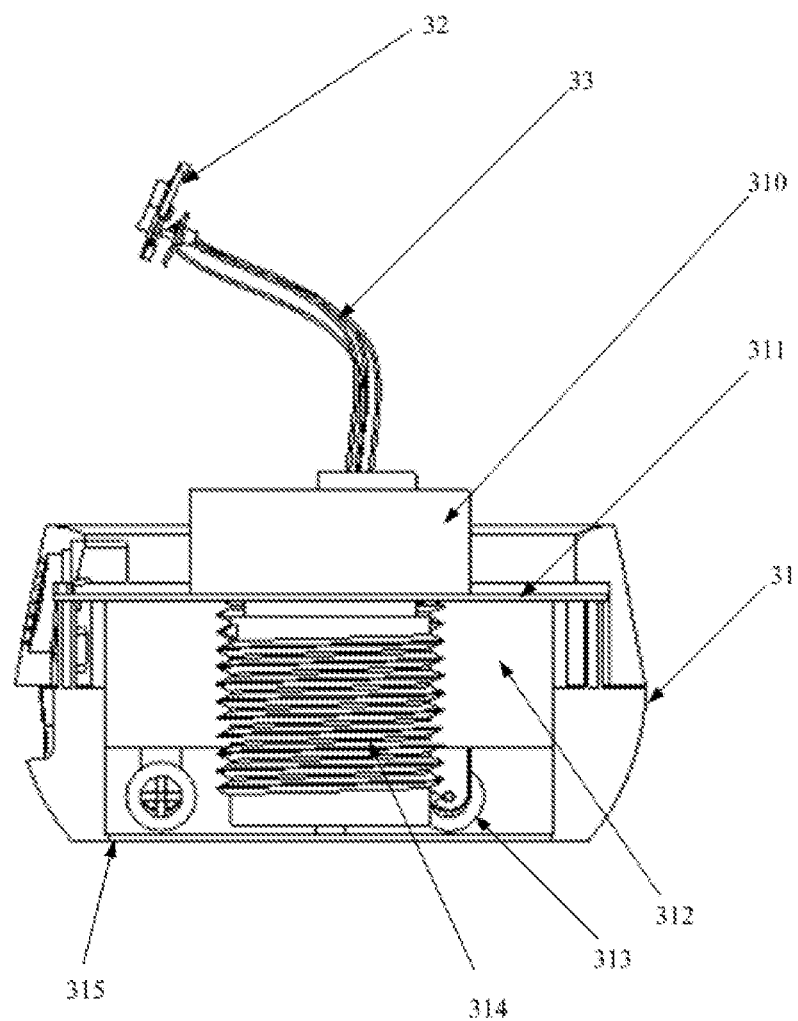
FIG. 3a is a schematic view of the structure of a service robot according to an embodiment of the present disclosure when its wheel is in a retracted state.

As shown in FIGS. 3a and 3b, the service robot of the present embodiment comprises a main body (not shown in FIGS. 3a and 3b) and a base 31. It should be noted that, in the present embodiment, the main body and the base of the service robot may be an integral structure.

A control button 32 is provided on a user-visible surface of the main body of the service robot. The control button 32 is connected with the motor 310 through a wire 33. The control button 32 receives a start instruction inputted by the user and sends the start instruction to the motor 310. A screw 314 and a nut 312 are provided in the base 31. The screw 314 and the nut 312 engage with each other. A wheel 313 is disposed below the nut 312. An upper limiting member (i.e., a first limiting member 311) and a lower limiting member (i.e., a second limiting member 315) are further provided in the base.

Here, as an example, the case that the wheel is retracted or extended one time is described. The rotation of the nut 312 is restricted due to the engagement of the guide grooves provided on the side surface and the anti-rotation protrusions of the base on which columns are provided, so the screw 314 can only move up and down axially along the screw 314. When the control button 32 is pressed one time, the motor 310 rotates forward, and the nut 312 and the wheel 313 move upward axially along the screw 314. When the nut 312 and the wheel 313 move upward by a predetermined distance (for example, 25 mm), the motor 310 stops rotating, and the wheel 313 is fully retracted into the inner cavity of the base, as shown in FIG. 3a. At this point, the robot as a whole can be fixedly placed on the desk surface and work. When the control button 32 is pressed again, the motor 310 rotates reversely, and the nut 312 and the wheel 313 move downward axially along the screw 314. When the nut 312 and the wheel 313 move by a predetermined distance (for example, 25 mm), the motor 310 stops rotating. At this point, the wheel 313 is exposed outside the inner cavity of the base, as shown in FIG. 3b. In this way, the service robot can be placed on the ground and roll to change the working position. As shown in FIG. 3b, when the nut 312 and the wheel 313 extend out of the inner cavity of the base, the cavity of the base can be seen as an inner hollow structure. Such a design ensures that a sufficient space 316 is reserved to facilitate the moving up and down of the wheel 313.

Under this control mode, the motion path of the nut may be particularly controlled by a first travel switch and a second travel switch provided in the motor 310. For example, after the motor 310 receives a start instruction sent by the control button 32, the motor 310 rotates forward, drives the screw 314 to rotate and in turn drives the nut 312 and the wheel 313 to move upward axially along the screw 314. When the nut 312 moves upward and triggers the first travel switch, the motor 310 stops rotating. After the motor 310 receives a start instruction sent by the control button 32 again, the motor 310 rotates reversely, drives the screw 314 to rotate and in turn drives the nut 312 and the wheel 313 to move downward axially along the screw 314. When the nut 312 moves downward and triggers the second travel switch, the motor 310 stops rotating. It can be understood that the position of the travel switches can be adjusted as needed to meet the actual demand.

In addition, the present embodiment further provides another control method. Here, as an example, the case that the wheel is retracted or extended one time is described. When the control button 32 is pressed one time, the motor 310 rotates forward, and the nut 312 and the wheel 313 move upward axially along the screw 314. When the path is close to the top panel of the body (i.e., the first limiting member 311), the motor 310 stops rotating, and the wheel 313 is fully retracted into the inner cavity of the base, as shown in FIG. 3a. At this point, the robot as a whole can be fixedly placed on the desk surface and work. When the control button 32 is pressed again, the motor 310 rotates reversely, and the nut 312 and the wheel 313 move downward axially along the screw 314. When the nut moves to the lower limiting member (i.e., the second limiting member 315), the motor 310 stops. At this point, the wheel 313 is exposed from the inner cavity of the base of the service robot, as shown in FIG. 3b, and the service robot can be placed on the ground and roll to work, which meets the demand of changing the working position at any time.

It should be noted that, in the present embodiment, a mechanical mode and a circuit mode are provided to control the motion path of the wheel. In practice, those skilled in the art can select the control mode and set the motion path of the wheel according to the actual demand. For example, the specific position of the wheel to retract into the inner cavity or the distance by which the wheel extends out of the inner cavity may be controlled, which is not limited.

In the present embodiment, the wheel 313 may be a fixed caster or a movable caster (also called an omni-directional wheel), and the number of the wheel 313 is at least one. In practice, the number of the wheels may be chosen as required; for example, three wheels may be provided, which is not limited.

Therefore, the service robot of the embodiment of the present disclosure has the following advantages. First, the wheel of the service robot can be automatically retracted, and when the service robot needs to be placed on the desk surface, the wheel can retract to prevent the service robot from sliding on the desk surface. Second, when the wheel of the service robot is an omni-directional wheel, it can rotate by 360 degrees with respect to the main body of the robot, and the flexibility of rolling when it is used on the floor is ensured. Finally, after the wheel of the robot of the present disclosure extends out of the inner cavity, the service robot may be prevented from sliding freely by a fixing device provided on the wheel in advance.

Fourth Embodiment

An embodiment of the present disclosure further provides a method for controlling a service robot. FIG. 4 is a flowchart of a method for controlling a service robot according to an embodiment of the present disclosure. Referring to FIG. 4, the method comprises:

Step S41, providing a motor, a transmission mechanism and a wheel in an inner cavity of a base of the service robot, connecting the transmission mechanism with the motor and the wheel respectively, disposing the wheel below the transmission mechanism, and reserving a space in the inner cavity of the base for the transmission mechanism to move up and down;

Step S42, driving the transmission mechanism to move in the inner cavity of the base according to a predetermined stroke by the motor after the motor is started, and driving the wheel while the transmission mechanism is moving so that the wheel can retract into the inner cavity of the base or extend out of the inner cavity of the base.

In the present embodiment, the step of providing a transmission mechanism in the inner cavity of the base of the service robot in Step S41 comprises:

providing a screw and a nut engaged with the screw in the inner cavity of the base of the service robot;

fixedly connecting the screw and the motor, and mounting the wheel on the lower end surface of the nut; the inner cavity of the base being cylindrical;

providing a guide groove on a side surface of the nut, so that the nut can only move up and down axially along the screw when a column is inserted into the guide groove;

driving the screw to rotate after the motor is started, driving the nut to move up and down while the screw is rotating, and in turn driving the wheel on the nut to retract into the inner cavity of the base or extend out of the inner cavity of the base.

In the present embodiment, in Step S42, the step of driving the screw to rotate after the motor is started, driving the nut to move up and down while the screw is rotating, and in turn driving the wheel on the nut to retract into the inner cavity of the base or extend out of the inner cavity of the base comprises:

using a first travel switch and a second travel switch provided in the motor, so that after the motor is started, the motor rotates in a first preset direction, drives the screw to rotate, and in turn drives the nut and the wheel to move upward axially along the screw, and when the nut moves upward to trigger the first travel switch, the motor stops rotating; and after the motor is started again, the motor rotates in a second preset direction, drives the screw to rotate, and in turn drives the nut and the wheel to move downward axially along the screw, and when the nut moves downward to trigger the second travel switch, the motor stops rotating;

or, providing a first limiting member and a second limiting member in the inner cavity of the base, so that after the motor is started, the motor rotates in a first preset direction, drives the screw to rotate, and in turn drives the nut and the wheel to move upward axially along the screw, and when the nut moves upward to the position of the first limiting member, the motor stops rotating; and after the motor is started again, the motor rotates in a second preset direction, drives the screw to rotate, and in turn drives the nut and the wheel to move downward axially along the screw, and when the nut moves downward to the position of the second limiting member, the motor stops rotating.

Therefore, by providing a transmission mechanism in the service robot and connecting the transmission mechanism with the wheel and the motor, and then using the motor to drive the transmission mechanism to move and in turn drive the wheel to move, the effect of extending the wheel out of the base of the robot or retracting the wheel into the base of the robot can be achieved.

It should be noted that, the implementation steps of the method for controlling a service robot in the present embodiment are corresponding to the working process of the service robot as described above, so the implementation steps of the method for controlling a service robot in the present embodiment may refer to the relevant illustration of the above embodiments of the present disclosure, and will not be repeated here.

In summary, the service robot according to the embodiments of the present disclosure controls the transmission mechanism to move up and down in the inner cavity of the base by the motor, so that the wheel disposed below the transmission mechanism can retract into the inner cavity of the base or extend out of the inner cavity of the base. Because the wheel of the service robot of the present embodiment can be automatically retracted, the service robot can be stably placed on the desk surface or other planes and work, and it can also be placed on the ground to roll and work, thereby meeting the user's needs under different circumstances and improving the competitiveness of service robots. In addition, the present disclosure also provides a method for controlling a service robot to implement the service robot according to the embodiments of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A service robot, comprising a main body (101) and a base (102, 26), wherein
   a motor (1021, 21), a transmission mechanism (1022) and a wheel (1023, 25) are provided in an inner cavity of the base (102, 26), the transmission mechanism (1022) is connected with the motor (1021, 21) and the wheel (1023, 25) respectively, the wheel (1023, 25) is disposed below the transmission mechanism (1022), and a space for the transmission mechanism (1022) to move up and down is formed in the inner cavity of the base (102, 26); and
   after the motor (1021, 21) is started, the transmission mechanism (1022) is driven to move in the inner cavity of the base (102, 26) according to a predetermined stroke, and the transmission mechanism (1022) drives the wheel (1023, 25) while the transmission mechanism (1022) is moving, and the wheel (1023, 25) can retract into the inner cavity of the base (102, 26) or extend out of the inner cavity of the base (102, 26).

2. The service robot according to claim 1, wherein the transmission mechanism (1022) comprises a screw (23) and a nut (24) engaged with the screw (23);
   the screw (23) is fixedly connected with the motor (1021, 21), and the wheel (1023, 25) is mounted on a lower end surface of the nut (24);
   the inner cavity of the base (102, 26) is cylindrical;
   a guide groove (241) is formed on a side surface of the nut (24), and after a column (261) is inserted into the guide groove (241), the nut (24) can only move up and down axially along the screw (23); and
   after the motor (1021, 21) is started, the motor (1021, 21) drives the screw (23) to rotate, and the screw (23) drives the nut (24) to move up and down while the screw (23) is rotating, and in turn drives the wheel (1023, 25) on the nut (24) to retract into the inner cavity of the base (102, 26) or extend out of the inner cavity of the base (102, 26).

3. The service robot according to claim 1, wherein a control button (32) is provided on the main body (101) of the service robot, the control button (32) is connected with the motor (1021, 21) through a wire, and the control button (32) receives a start instruction inputted by a user and sends the start instruction to the motor (1021, 21).

4. The service robot according to claim 3, wherein a first travel switch and a second travel switch are provided in the motor (1021, 21);
   after the motor (1021, 21) receives the start instruction sent by the control button (32), the motor (1021, 21) rotates in a first preset direction, drives the screw (23) to rotate, and in turn drives the nut (24) and the wheel (1023, 25) to move upward axially along the screw (23), and when the nut (24) moves upward to trigger the first travel switch, the motor (1021, 21) stops rotating; and
   after the motor (1021, 21) receives the start instruction sent by the control button (32) again, the motor (1021, 21) rotates in a second preset direction, drives the screw (23) to rotate, and in turn drives the nut (24) and the wheel (1023, 25) to move downward axially along the screw (23), and when the nut (24) moves downward to trigger the second travel switch, the motor (1021, 21) stops rotating.

5. The service robot according to claim 3, wherein a first limiting member (311, 22) and a second limiting member (315, 262) are further provided in the inner cavity of the service robot;
   the first limiting member (311, 22) is hollow disk shaped, and an upper end of the screw (23) passes through a hollow portion of the first limiting member (311, 22) and is sleeved together with the first limiting member (311, 22); and
   the second limiting member (315, 262) is ring shaped, and is formed by extending a lower surface of the inner cavity of the base (102, 26) inwardly and horizontally by a predetermined width.

6. The service robot according to claim 5, wherein
   after the motor (1021, 21) receives the start instruction sent by the control button (32), the motor (1021, 21) rotates in a first preset direction, drives the screw (23) to rotate, and in turn drives the nut (24) and the wheel (1023, 25) to move upward axially along the screw (23), and when the nut (24) moves upward to the position of the first limiting member (311, 22), the motor (1021, 21) stops rotating; and
   after the motor (1021, 21) receives the start instruction sent by the control button (32) again, the motor (1021, 21) rotates in a second preset direction, drives the screw (23) to rotate, and in turn drives the nut (24) and the wheel (1023, 25) to move downward axially along the screw (23), and when the nut (24) moves downward to the position of the second limiting member (315, 262), the motor (1021, 21) stops rotating.

7. The service robot according to claim 3, wherein
   after the motor (1021, 21) receives the start instruction sent by the control button (32), the motor (1021, 21)

rotates in a first preset direction, drives the screw (23) to rotate, and in turn drives the nut (24) and the wheel (1023, 25) to move upward axially along the screw (23), and when the upward path reaches a predetermined distance, the motor (1021, 21) stops rotating; and after the motor (1021, 21) receives the start instruction sent by the control button (32) again, the motor (1021, 21) rotates in a second preset direction, drives the screw (23) to rotate, and in turn drives the nut (24) and the wheel (1023, 25) to move downward axially along the screw (23), and when the downward path reaches a predetermined distance, the motor (1021, 21) stops rotating.

8. The service robot according to claim 2, wherein a plurality of guide grooves (241) are evenly provided on the side surface of the nut (24); and the wheel (1023, 25) is a fixed caster or a movable caster, and the number of the wheel (1023, 25) is at least one.

9. A method for controlling a service robot, wherein the method comprises:

providing a motor (1021, 21), a transmission mechanism (1022) and a wheel (1023, 25) in an inner cavity of a base (102, 26) of the service robot;

connecting the transmission mechanism (1022) with the motor (1021, 21) and the wheel (1023, 25) respectively, disposing the wheel (1023, 25) below the transmission mechanism (1022), and reserving a space in the inner cavity of the base (102, 26) for the transmission mechanism (1022) to move up and down; and driving the transmission mechanism (1022) to move in the inner cavity of the base (102, 26) according to a predetermined stroke by the motor (1021, 21) after the motor (1021, 21) is started, and driving the wheel (1023, 25) while the transmission mechanism (1022) is moving, and the wheel (1023, 25) can retract into the inner cavity of the base (102, 26) or extend out of the inner cavity of the base (102, 26).

10. The method according to claim 9, wherein the step of providing a transmission mechanism (1022) in the inner cavity of the base (102, 26) of the service robot comprises:

providing a screw (23) and a nut (24) engaged with the screw (23) in the inner cavity of the base of the service robot;

fixedly connecting the screw (23) and the motor (1021, 21), and mounting the wheel (1023, 25) on a lower end surface of the nut (24);

the inner cavity of the base (102, 26) being cylindrical;

providing a guide groove (241) on aside surface of the nut (24), so that the nut (24) can only move up and down axially along the screw (23) after a column (261) is inserted into the guide groove (241); and driving the screw (23) to rotate after the motor (1021, 21) is started, driving the nut (24) to move up and down while the screw (23) is rotating, and in turn driving the wheel (1023, 25) on the nut (24) to retract into the inner cavity of the base (102, 26) or extend out of the inner cavity of the base (102, 26).

11. The method according to claim 10, wherein the step of driving the screw (23) to rotate after the motor (1021, 21) is started, driving the nut (24) to move up and down while the screw (23) is rotating, and in turn driving the wheel (1023, 25) on the nut (24) to retract into the inner cavity of the base (102, 26) or extend out of the inner cavity of the base (102, 26) comprises:

using a first travel switch and a second travel switch provided in the motor (1021, 21), so that after the motor (1021, 21) is started, the motor (1021, 21) rotates in a first preset direction, drives the screw (23) to rotate, and in turn drives the nut (24) and the wheel (1023, 25) to move upward axially along the screw (23), and when the nut (24) moves upward to trigger the first travel switch, the motor (1021, 21) stops rotating; and after the motor (1021, 21) is started again, the motor (1021, 21) rotates in a second preset direction, drives the screw (23) to rotate, and in turn drives the nut (24) and the wheel (1023, 25) to move downward axially along the screw (23), and when the nut (24) moves downward to trigger the second travel switch, the motor (1021, 21) stops rotating.

12. The method according to claim 10, wherein the step of driving the screw (23) to rotate after the motor (1021, 21) is started, driving the nut (24) to move up and down while the screw (23) is rotating, and in turn driving the wheel (1023, 25) on the nut (24) to retract into the inner cavity of the base (102, 26) or extend out of the inner cavity of the base (102, 26) comprises:

providing a first limiting member (311, 22) and a second limiting member (315, 262) in the inner cavity of the base (102, 26), so that after the motor (1021, 21) is started, the motor (1021, 21) rotates in a first preset direction, drives the screw (23) to rotate, and in turn drives the nut (24) and the wheel (1023, 25) to move upward axially along the screw (23), and when the nut (24) moves upward to the position of the first limiting member (311, 22), the motor (1021, 21) stops rotating; and after the motor (1021, 21) is started again, the motor (1021, 21) rotates in a second preset direction, drives the screw (23) to rotate, and in turn drives the nut (24) and the wheel (1023, 25) to move downward axially along the screw (23), and when the nut (24) moves downward to the position of the second limiting member (315, 262), the motor (1021, 21) stops rotating.

* * * * *